US011064343B2

(12) United States Patent
Dos Santos et al.

(10) Patent No.: US 11,064,343 B2
(45) Date of Patent: Jul. 13, 2021

(54) MANAGEMENT OF SUBSCRIBER PROFILES SIMULTANEOUSLY ACTIVE IN AN EUICC CARD USING A PLURALITY OF SEPARATE LINKS

(71) Applicant: IDEMIA France, Courbevoie (FR)

(72) Inventors: Elder Dos Santos, Courbevoie (FR); Jérôme Dumoulin, Courbevoie (FR); Jean-Michel Esteban, Courbevoie (FR); Sébastien Sohier, Courbevoie (FR); Alexis Michel, Ormesson-sur-Marne (FR)

(73) Assignee: IDEMIA FRANCE, Courbevoie (FR)

( * ) Notice: Subject to any disclaimer, the term of this patent is extended or adjusted under 35 U.S.C. 154(b) by 0 days.

(21) Appl. No.: 16/666,627

(22) Filed: Oct. 29, 2019

(65) Prior Publication Data

US 2020/0137555 A1   Apr. 30, 2020

(30) Foreign Application Priority Data

Oct. 30, 2018   (FR) ...................................... 1860059

(51) Int. Cl.
*H04M 1/66* (2006.01)
*H04W 8/18* (2009.01)
(Continued)

(52) U.S. Cl.
CPC ............. *H04W 8/18* (2013.01); *H04W 12/06* (2013.01); *H04W 76/10* (2018.02); *H04W 88/06* (2013.01)

(58) Field of Classification Search
CPC ...... H04L 63/08; H04W 12/06; H04W 12/08; H04W 8/183
See application file for complete search history.

(56) References Cited

U.S. PATENT DOCUMENTS 9,531,831 B1 *   12/2016   Cuadrat ................ H04W 8/183
2008/0287063 A1 *   11/2008   Kidron .................. G10L 19/167
                                                                       455/41.2
(Continued)

FOREIGN PATENT DOCUMENTS

FR   3 046 011   6/2017

OTHER PUBLICATIONS

French Search Report, Application No. 1860059, dated Jul. 1, 2019.
(Continued)

*Primary Examiner* — Shantell L Heiber
(74) *Attorney, Agent, or Firm* — Nixon & Vanderhye (57) ABSTRACT

Disclosed is management of a plurality of active subscriber profiles at the same time within the same secure element integrated in a host terminal. A baseband processor of the terminal and a communication interface controller of the secure element together establish different separate links for each one of the active profiles. It is thus possible to address, and therefore to simultaneously use, a plurality of profiles. A link can be the conventional ISO 7816 link. The HCI/SWP interface allows a large number of logical links (or HCI pipes) to be established using a single additional tab for connecting the secure element in the terminal. Each active profile is thus associated with an HCI pipe for routing messages relating thereto. As a variant or in combination, an SPI interface allows master-slave logical links to be established.

20 Claims, 6 Drawing Sheets

(51) Int. Cl.
*H04W 76/10* (2018.01)
*H04W 12/06* (2021.01)
*H04W 88/06* (2009.01)

(56) References Cited

U.S. PATENT DOCUMENTS

| | | |
|---|---|---|
| 2014/0220952 A1 | 8/2014 | Holtmanns et al. |
| 2015/0349826 A1* | 12/2015 | Li .................. H04W 8/183 |
| | | 455/558 |
| 2015/0350879 A1 | 12/2015 | Li et al. |
| 2016/0309324 A1* | 10/2016 | Praca .................. H04W 12/06 |
| 2016/0314309 A1* | 10/2016 | Rozak-Draicchio .... G06F 21/77 |
| 2017/0164184 A1* | 6/2017 | Borse .................. H04B 1/3816 |
| 2017/0351849 A1* | 12/2017 | Dottax .................. G06F 21/32 |
| 2018/0300492 A1* | 10/2018 | O'Donoghue ........ H04W 12/02 |
| 2018/0359629 A1* | 12/2018 | Manam ................ H04W 8/245 |

OTHER PUBLICATIONS

"Smart Cards; UICC—Contactless Front-end (CLF) Interface; Host Controller Interface (HCI) (Release 12)", Technical Specification, European Telecommunications Standards Institute (ETSI), 650, Route Des Lucioles ; F-06921, Sophia-Antipolis ; France, vol. SCP TEC, No. V12.0.0, Oct. 1, 2013 (Oct. 1, 2013), Xp014L57437, le document en entier.

* cited by examiner

MANAGEMENT OF SUBSCRIBER PROFILES SIMULTANEOUSLY ACTIVE IN AN EUICC CARD USING A PLURALITY OF SEPARATE LINKS

FIELD OF THE INVENTION

The present invention relates to secure elements used in host user terminals, and more specifically relates to the management and to the control of a multitude of simultaneously active subscriber profiles to allow the user to access a mobile telephony network.

CONTEXT OF THE INVENTION

The secure elements that are conventionally used for authentication on mobile telephony networks include UICC (Universal Integrated Circuit Card) cards, in particular SIM (Subscriber Identity Module) cards. Each card comprises subscription data, for example an IMSI (International Mobile Subscriber Identity) identifier, cryptographic keys and algorithms, specific to a subscription provided by a mobile telephony operator.

Multi-SIM terminals (generally two SIMs, in which case reference is made to a DUAL SIM terminal) have emerged allowing their users to have, and to therefore use simultaneously and without complex handling, a plurality of subscriptions. Each SIM card is then linked by an ISO link (via the contacts of the SIM card) to the baseband processor of the terminal, so that the two SIM cards are managed separately, with the baseband processor only routing the corresponding network streams.

eUICC (embedded UICC) cards have also emerged, which grant greater flexibility with respect to the management of subscriptions.

The main specifications of an eUICC card are defined by the GSMA (Global System for Mobile Communications Association) group in GSMA standard SGP.02 v 3.2, entitled "Remote Provisioning Architecture for Embedded UICC— Technical Specification—Version 3.2" dated 27 Jun. 2017. An eUICC module is a secure hardware element, which is generally small and can be integrated in a mobile host terminal in order to implement the functions of a conventional SIM card.

The eUICC cards are indeed reprogrammable and therefore allow a plurality of subscriber profiles (or communication profiles) to be downloaded, deleted and updated within the same eUICC card. Each subscriber profile is contained in a secure container (denoted ISD-P in accordance with the GSMA standard) that contains, like a conventional SIM card, the data that allows, when the profile is active, authentication with a corresponding mobile telephony network for accessing a service (for example, a voice or data service).

By changing the active subscriber profile in the eUICC card, it is possible to change operator or to modify the access to associated services (voice and/or data services, for example).

The GSMA standard only authorizes the activation of a single subscriber profile at a time. Furthermore, the activation of another subscriber profile leads to the deactivation of a then active subscriber profile.

An eUICC card can be integrated in the host terminal generally by soldering and has a single ISO link with the host terminal allowing management and access to the single active profile of the card.

This situation is unsatisfactory since it does not allow full advantage to be taken of the multitude of subscriber profiles present in the eUICC, as is the case in a DUAL SIM terminal.

One solution aiming to share the single ISO link between a plurality of subscriber profiles, as disclosed in document FR 3046011, is also unsatisfactory since it requires complex management of the APDU commands in accordance with the ISO 7816 protocol in order to distinguish the different streams of commands corresponding to different active subscriber profiles.

There is thus a need for technical solutions for facilitating the management of, and therefore the access to, a plurality of active profiles within the same eUICC card, in order to benefit from the many advantages of multi-SIM terminals (in particular the simultaneous accessibility to services relating to a plurality of profiles).

SUMMARY OF THE INVENTION

The present invention aims to overcome these limitations.

Within this context, the invention relates to a secure element suitable for interacting with a host terminal, the secure element comprising a communication interface controller for communicating with the host terminal and comprising a plurality of subscriber profiles, each subscriber profile authenticating a user in a mobile telephony network, and being configured to simultaneously activate a plurality of subscriber profiles, characterized in that the communication interface controller is configured to respectively associate a plurality of separate communication links with the host terminal with the plurality of active subscriber profiles.

The invention also relates to a host terminal suitable for integrating a secure element, the host terminal comprising a baseband processor configured to associate a plurality of separate communication links with the secure element with a respective plurality of active subscriber profiles of the secure element. The host terminal can thus establish different links for different active profiles and accordingly route streams (e.g. commands) relating to these different active profiles over the appropriate communication links.

A further aim of the invention is a method for controlling communication between a host terminal and a secure element integrated in the host terminal and comprising a plurality of subscriber profiles, each authenticating a user in a mobile telephony network, the method comprising:

establishing, for each active subscriber profile of a plurality of subscriber profiles simultaneously active in the secure element, a separate communication link between the host terminal and the secure element; and routing, in the host terminal or in the secure element (or in both), a stream of messages relating to an active subscriber profile to the communication link established for said active subscriber profile.

One concept of the invention is to overcome the limitation of a single physical ISO connection tab between the secure element, typically an eUICC card, and the host terminal to enable a greater number of communication links.

This allows the secure element to use separate communication channels for a plurality of active profiles. The host terminal, in particular its baseband processor, can then access the active profiles using separate and independent channels. The simultaneous use of a plurality of subscriber profiles is thus rendered possible, without requiring complex management with respect to the APDU messages.

Optional features of embodiments of the invention are defined in the dependent claims.

According to one embodiment, the plurality of separate communication links comprises a single ISO link compliant with standard ISO 7816 (more specifically ISO 7816-3 and 7816-4). This reference to a conventional ISO link allows conventional operation to be maintained, for at least one active profile. The links for the other active profiles therefore will be completed on one or more different physical links.

According to a specific embodiment, the plurality of separate communication links comprises two or more ISO links compliant with standard ISO 7816. In this case, the invention enables management and access to two or more active profiles of the secure element in accordance with conventional procedures. The secure element is nevertheless specific in that new physical ISO connection tabs are added and the internal communication interface controller takes this into account to route the streams of commands to the suitable profiles (ISD-P). The same applies for the baseband processor of the host terminal.

Of course, other embodiments are based on one or more communication links other than ISO links.

According to a particularly advantageous embodiment, the plurality of separate communication links comprises at least one logical link (or pipe) established through a Host Controller Interface (HCI) on a physical link between the secure element and the host element. This HCI is particularly defined in technical document ETSI TS 102 622 V12.0.0, entitled "Smart Cards; UICC—Contactless Front-end (CLF) Interface; Host Controller Interface (HCI)".

The configuration proposed herein advantageously allows a very large number of active profiles of the secure element to be easily addressed through a limited number of additional physical connection tabs (physical link) between the secure element and the terminal. In particular, a plurality (i.e. two or more) of logical links established through the HCI on the physical link is associated with a respective plurality of active subscriber profiles of the secure element. In a particularly effective embodiment, the HCI is implemented on the Single Wire Protocol (SWP) (with an ISO data link layer), which is defined in technical document ETSI TS 102 613 V11.0.0, entitled "Smart Cards; UICC—Contactless Front-end (CLF) Interface; Part 1: Physical and data link layer characteristics", between the host terminal and the secure element. Reference is made herein to SWP/HCI technology that requires only one connection tab for simultaneously managing a plurality of active profiles of the secure element.

On the host terminal side, a host controller of the HCI is implemented in a CLF (Contact Less Front-end) contactless communication management module, which conventionally equips NFC (Near Field Communication) compatible terminals; and a host process of the baseband processor is configured to establish, for an active subscriber profile, a pipe (according to the HCI nomenclature) with a service (directly associated with a "gate" in the HCI) managing the active subscriber profile in the secure element, via the CLF management module acting as host controller of the HCI.

The present invention thus benefits from the flexibility of the HCI interface conventionally reserved for applicative uses other than the management of subscriber profiles.

As a variant to the SWP/HCI technology, the plurality of separate communication links can comprise one, two or more logical links established through a Serial Peripheral Interface (SPI). Once again, a master entity in the baseband processor is configured to establish a master-slave link for each one of the one or more active subscriber profiles, with a dedicated slave entity provided in the secure element.

Other variants can be contemplated, such as those based on the use of an I2C (Inter-Integrated Circuit) bus or on an I3C (Improved Inter-Integrated Circuit) communication interface.

In one embodiment, a plurality of communication services (for example, HCI gates or SPI services) is pre-assigned to a plurality of communication resources (for example, antennae or a resource of multiplexing by an antenna) on one or more mobile telephony networks, and said separate communication links are established on the basis of the pre-assigned communication services so that each active subscriber profile is associated with a respective communication resource. This arrangement is advantageous in that the operations for routing messages on the host terminal (via the baseband processor) are simplified: there is a bijection between each communication resource (on which it receives or has to transmit a message) and a communication service with the secure element.

In this case, the communication interface controller is configured to, during the activation of a profile, instantiate a communication service and to establish a communication link between the instantiated service and a pre-assigned service of the host terminal. Since the pre-assigned services are static, the secure element can know them in advance or recover the information from the host terminal each time that a new profile is activated.

According to embodiments of the invention, the secure element is configured to simultaneously activate (i.e. to simultaneously maintain in an active state) a plurality of subscriber profiles managed under the same root security domain, known under the designation ISD-R in accordance with the GSMA standard. In a particular embodiment, the plurality of subscriber profiles present in the secure element is managed under a single root security domain, ISD-R. A single SM-SR (and therefore participating) is then necessary for managing the profiles.

As a variant, the plurality of subscriber profiles present in the secure element is distributed under the management of two or more root security domains. The secure element is thus shared between a plurality of owners (ownership), allowing an increase in the possibilities of profiles for the user with these different owners.

In a multi-ownership embodiment, the plurality of subscriber profiles present in the secure element is distributed under the management of two or more root security domains, and the secure element is configured to activate a single subscriber profile per root security domain at a time. In this configuration, the management of the subscriber profiles on each ISD-R is advantageously compliant with the GSMA standard.

In one embodiment of the invention, the communication links are established to convey APDU messages, which include at least one field allowing a plurality of logical sub-channels to be defined, for example, up to twenty logical sub-channels. This field can be a sub-field of the current class CLA byte, mandatorily, in the header of the APDU commands in accordance with standard ISO 7816. For example, the field is formed by bits denoted b2b1 when b8b7 equals '00' (thus offering 4 logical channel numbers, from 0 to 3) and by bits b4b3b2b1 when b8b7 equals '01' (thus offering 16 other logical channel numbers, from 4 to 19).

The invention also relates to a microprocessor-readable information medium, comprising instructions of a computer program for implementing the aforementioned method, when said instructions are downloaded and executed by the microprocessor.

This program can use any programming language and can be in the form of source code, object code, or of intermediate code between source code and object code, such as in a partially compiled form, or in any other desirable form.

The information medium can be any entity or device capable of storing the program. For example, the medium can comprise a storage means, such as a ROM, for example, a microcircuit ROM, or even a magnetic recording means, for example, a hard disk, or even a flash memory.

Furthermore, the information medium can be a transmittable medium, such as an electrical or optical signal, which can be routed via an electrical or optical cable, by radio or by other means. The program particularly can be downloaded onto a storage platform of an Internet type network, a communication type network, or even a telecommunication type network.

Alternatively, the information medium can be an integrated circuit, in which the program is incorporated, with the circuit being adapted to execute, or to be used in the execution of, the one or more methods in question.

BRIEF DESCRIPTION OF THE FIGURES

Further features and advantages of the invention will become more apparent from the following description, which is illustrated by the accompanying figures, which illustrate embodiments without any limiting nature and in which.

DETAILED DESCRIPTION OF THE INVENTION

The present invention relates to the management of secure elements such as eUICCs, and in particular to the management of subscriber profiles in these eUICCs.

A secure element, denoted SE, is a tamperproof hardware component or platform (typically a chip) used in a host terminal and capable of securely housing applications and data in accordance with security rules and requirements set by trusted authorities.

Among the three form factors of an SE, the UICC defines a physical chip that contains the application authenticating a user in a mobile telephony network for accessing services (voice, data, etc.). To this end, it contains applications such as the SIM (Subscriber Identity Module) application holding the information for identifying the subscriber in the mobile network.

An eUICC is a UICC chip that is integrated in a host terminal, with or without the possibility of removal depending on its form factor. Mechanisms have been contemplated for securely managing different subscriptions within the same eUICC card. The technical documents "Remote Provisioning Architecture for Embedded UICC—Technical Specification" (Version 3.2 dated 27 Jun. 2017) and "Remote SIM Provisioning (RSP) Architecture for consumer Devices" (Version 2.1 dated 27 Feb. 2017), compiled by the GSM Association (or GSMA), describe some recommended mechanisms.

Figure 1:
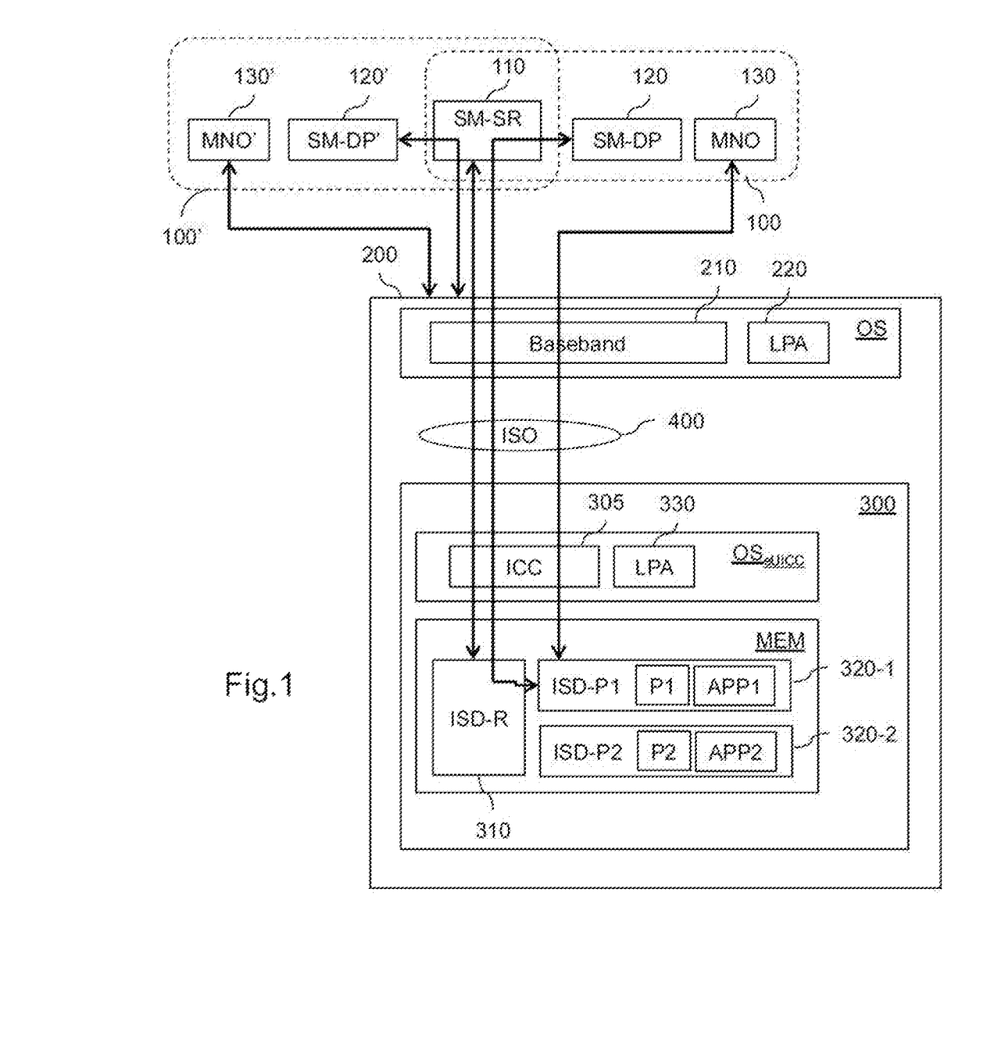
FIG. 1 schematically illustrates an example of a system for managing profiles in an eUICC integrated in a host terminal according to known techniques.

FIG. 1 schematically illustrates a structure of a system for managing profiles in an eUICC integrated in a host terminal, pursuant to documents of the GSMA standard in "consumer" mode. The "M2M" (machine-to-machine) mode is based on a relatively similar architecture, but in which the LPA modules described hereafter are not implemented.

A plurality of mobile telephony networks 100, 100' can coexist, corresponding, for example, to a plurality of mobile telephony operators MNO, MNO' (Mobile Network Operator). In a known manner, these networks can share certain resources.

The mobile telephony network 100 comprises an SM-SR secure routing unit 110 of a subscription management server SM (not shown for the sake of readability), an SM-DP data preparation unit 120 of a (same) subscription management server and servers 130 specific to the MNO operator managing this mobile telephony network. The main functions, which are well known, of these units/servers are described hereafter. Even though the SM-SR and SM-DP servers are shown separately, they can be implemented within the same server (denoted SM-DP+). The present invention is also applicable to other mobile telephony network architectures.

The other mobile networks 100' generally have a similar structure (in particular an SM-DP' data preparation unit 120', servers 130' specific to the MNO' operator), in which the SM-SR unit 110 can be shared between mobile networks.

A mobile terminal 200, for example, a portable telephone, a smart phone, a computer, a tablet, etc., comprises an eUICC card 300 for securely accessing the services of the mobile networks 100, 100'.

In this particular embodiment, the mobile terminal 200 comprises an operating system OS able to control a communication interface (not shown) with the mobile network and to carry out the interfacing between this communication interface and the eUICC card 300. The part of the OS carrying out these operations is known as a baseband processor 210. Other conventional components of the mobile telephone 200 (such as a battery, a radio transceiver unit, an antenna, user interfaces—screen, keyboard, etc.) are not illustrated in the figure for the sake of clarity.

In the figure, only one mobile terminal 200 with an eUICC on board is shown. Of course, the mobile telephony network generally includes a plurality of such mobile terminals equipped with eUICC cards (or SIM, USIM). The present description relates to eUICC cards by way of an example. In general, the present invention can be implemented in any type of secure element SE containing a plurality of subscriber profiles, for example, embedded secure elements, or "eSE".

The eUICC card 300 comprises an operating system $OS_{eUICC}$ (stored in a read-only type non-volatile memory or a flash memory, for example) paired with a non-volatile memory MEM. Other conventional components present in the eUICC are not shown herein for the sake of clarity: interface (and associated controller) for communicating with the host terminal, random access memory, data bus, processor, etc.

In accordance with the GSMA standard, the eUICC card 300 comprises, in a non-volatile memory MEM, one or more security domains for managing the card and subscriber profiles:

a root or favored issuer security domain 310 (ISD-R "Issuer Security Domain—Root") that is defined, when the eUICC is manufactured, as representing the owner of the card 300 and is therefore accessible (via a particular set of cryptographic keys) only by the owner. This ISD-R root domain initially comprises an initial profile (called "provisioning profile" according to the GSMA standard) allowing network connectivity with the SM-SR unit 110;

one or more profile security domains 320 (ISD-P "Issuer Security Domain—Profile") generally each dedicated to an MNO operator. Each ISD-P domain is a secure container (protected by a set of cryptographic keys in particular) designed to securely store a single subscriber profile P associated with a service subscription with the corresponding MNO operator and to grant access thereto.

In a known manner, a communication profile P comprises subscription data (for example, an IMSI identifier, cryptographic keys, authentication algorithms and Network Access Application (NAA), etc.) and can further comprise a system of files, applications APP, and/or predetermined execution rules.

In the example described herein, as illustrated in FIG. 1, it has been assumed that the eUICC card 300 comprises two security domains ISD-P1, ISD-P2 respectively containing a single profile P1, P2, which each can be in the active or inactive state. Due to this uniqueness, reference is equally made to an "active profile" and an "active ISD-P".

The term "active" profile or profile in the "active" state is herein understood to be the fact that a subscriber profile is activated in the eUICC card 300 in order to authorize the host terminal 200 (with which it interacts) to use the data of the profile in order to be authenticated with and to communicate with the mobile telephony network 100 associated with the profile in question. In accordance with the GSMA standard, a profile P (or the secure domain ISD-P 320 in which it is contained) is said to be "active" (ENABLED) when its status parameter, denoted "life cycle", is positioned in state '3F'. According to the GSMA standard, a profile is, on the contrary, said to be "inactive" (DISABLED) when its "life cycle" status parameter is positioned in state '1F'.

The profile P1 (respectively P2) authorizes, when it is active, the host terminal 200 to communicate with a mobile network 100 (respectively 100') associated with the telephony operator MNO (respectively MNO'). The security domain ISD-P1 (respectively ISD-P2) also can comprise applications APP1 (respectively APP2) specific to the operator MNO (respectively MNO') with which the user has subscribed. Alternatively, these applications APP can be contained directly in the respective profile.

The ISD-R root security domain is favored in that it is particularly suitable for creating or deleting security domains ISD-P 320 in the non-volatile memory MEM and for activating or deactivating profiles P loaded in these ISD-Ps 320 of the eUICC.

In a manner that is known from the GSMA standard, this management is carried out by exchanging messages (commands, responses) between the SM-SR unit 110 and the root domain ISD-R 310. The different management functions and commands of the eUICC 300 are defined in the GSMA document "Remote Provisioning Architecture for Embedded UICC—Technical Specification".

These commands and responses are particularly transmitted in the form of APDU messages through an ISO link 400 (compliant with ISO 7816-3 and 7816-4, for example) between the baseband processor 210 and the eUICC 300. The APDU messages compliant with the ISO 7816 standard include a field for creating up to twenty logical sub-channels in the ISO channel 400. Typically, this field is made up of bits forming the current class CLA byte, mandatorily, in the header of the APDU commands compliant with the ISO 7816 standard. For example, the field is formed by bits denoted b2b1 when b8b7 equals '00' (thus offering 4 logical channel numbers, from 0 to 3) and by bits b4b3b2b1 when b8b7 equals '01' (thus offering 16 other logical channel numbers, from 4 to 19).

Such logical sub-channels defined by the APDU messages are generally used to address a plurality of applications of the same smart card, on the single ISO communication link 400.

The commands are received by a part of the $OS_{eUICC}$ that is dedicated to controlling communications with the host terminal, it involves a communication control interface ICC 305.

The communication between the SM-SR unit 110 and the ISD-R 310 can be provided and/or protected by the SCP80, SCP81 or CAT-TP protocol.

Still in a manner known from the GSMA standard, the secure downloading, updating or deletion of profiles in the secure ISD-P domains 320 is implemented by exchanging messages (commands, responses) between the SM-DP unit 120 and each relevant secure ISD-P domain of the eUICC 300. The SM-DP unit 120 particularly prepares the profile packages to be downloaded in the eUICC, then sends them to the relevant ISD-P domain 320 via the SM-SR unit 110 and the ISD-R 310. APDU messages are again used. The communication between the SM-DP unit 120 and the ISD-P 320 (via the SM-SR 110) can be protected by the SCP02 or SCP03 protocol, encapsulated (on the SM-SR—ISD-R interface) in the SCP80, SCP81 or CAT-TP protocol.

In detail, the GSMA document "Remote SIM Provisioning (RSP) Architecture for consumer Devices" defines services for managing profiles, known as LPA (Local Profile Assistant), that can be implemented in the host terminal (LPA 220) and/or in the eUICC (LPA 330, which may or may not form part of the ISD-R 310). By way of an example, these services can include a local profile discovery service (LDS "Local Discovery Service") for determining the profiles P present in the eUICC and their active or inactive state, a local profile download service (LPD "Local Profile Download") for implementing the sequential downloading operations or for updating a profile P, and a local user interface service (LUI "Local User Interface") for recovering/acquiring the profile management actions locally initiated by the user (download, activation, deactivation, etc.).

When a subscriber profile P downloaded thus is activated by the SM-SR 110 (or as a variant by the user via a menu on the host terminal 200), it is equivalent to a UICC: it allows the user to be identified on the mobile network 100 of the MNO operator with which they have subscribed for the subscription corresponding to the profile in order to access services.

The MNO operator 130 can also access the active profile P (and particularly some actions provided by the operator in this profile) in order to complete various types of actions (in particular remote management of a component of the profile 320, for example, updating data or an offer or execution rules, etc.). Reciprocally, applications in the active profile P can be configured to transmit data to the MNO 130. These exchanges are illustrated in FIG. 1 by a two-way arrow between the MNO 130 and the profile P1/application APP1. These exchanges are generally implemented using APDU messages between the MNO 130 and the active profile P, possibly protected by the SCP80, SCP81 or CAT-TP protocol.

The presence of a plurality of profiles within the eUICC 300 facilitates the management of a plurality of mobile telephony subscriptions of a user allowing, for example, rapid change over (without replacing their UICC card) of an operator when crossing the border or depending on the nature of the desired service (voice, data, overseas call) or the time of access to the surface (different rates depending on the profiles).

However, in the current state of the GSMA standard, a single active profile 320 at a time is authorized within the eUICC 300, the other profiles (if they exist) are then inactive until a subsequent activation that automatically renders the currently active profile inactive. The user of the terminal 200 therefore only has access to a single mobile network at a time: that of the MNO operator corresponding to the active profile.

In order to simultaneously activate a plurality of subscriber profiles, the conventional solutions are based on multi-SIM terminals, generally provided with two SIM cards (reference is then made to DUAL SIM terminals), even if some propose three and even four SIM card slots.

Figure 2:
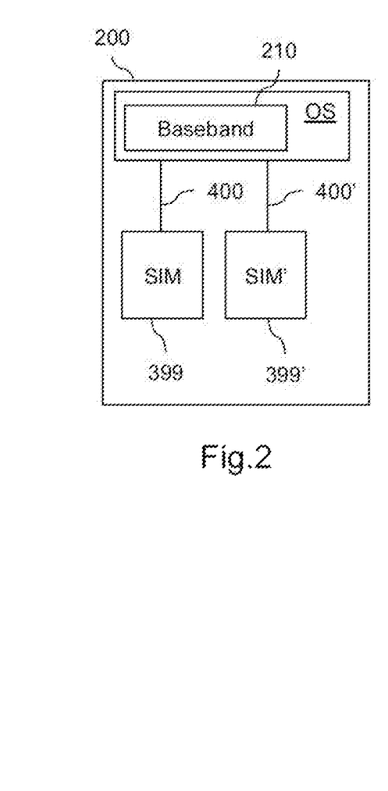
FIG. 2 schematically shows the case of a DUAL SIM terminal as known.

As is schematically illustrated in FIG. 2, each card SIM 399, SIM' 399' is then linked to the baseband processor 210 through a specific ISO 7816 link 400, 400'. Thus, each SIM card is used separately.

Unless otherwise stated, the common or similar elements in several figures use the same reference signs and have identical or similar features.

The terminals referred to as DUAL ACTIVE terminals allow the two cards SIM 399, SIM' 399' to be active and to therefore operate (in order to receive/transmit a call/data) at the same time. These terminals comprise two transmitters/emitters (e.g. physical antennae), one dedicated to each SIM card.

The terminals referred to as DUAL STANDBY terminals do not allow this simultaneous activity. The two SIM cards are initially active until one 399 of them is required to transmit or receive a call/data. In response to this requirement, the other card SIM' 399' becomes inactive.

In these DUAL SIM terminals, the baseband processor 210 that processes the received mobile signals is configured to statically associate the two ISO links with the two SIM cards, and to thus route the network streams received from the mobile network 100. These routing mechanisms are directly based on the 3GPP network protocol properties.

In order to simultaneously use a plurality of subscriber profiles, the solution that involves integrating two eUICC cards in the host terminal does not appear to be satisfactory, since it is expensive and does not take advantage of the already existing possibility of providing a plurality of profiles in a single eUICC card.

The solution to this problem that is proposed in document FR 3046011 is not completely satisfactory. It requires complex management of the APDU commands in order to differentiate the different ISD-Ps or active profiles to be targeted.

A requirement therefore exists for technical solutions for allowing the management of, and therefore the access to, a plurality of active profiles within the same eUICC card, in order to benefit from the many advantages of DUAL SIM terminals (in particular the simultaneous accessibility to services concerning a plurality of profiles).

According to the invention, the communication interface controller ICC 305 is configured to respectively associate a plurality of separate communication links with the host terminal 200 with a plurality of subscriber profiles P simultaneously active in the eUICC 300. In order to allow effective communication with the host terminal 200, the baseband processor 210 of said terminal is also configured to associate a plurality of separate communication links with the secure element with this same plurality of subscriber profiles P simultaneously active in the secure element 300.

Thus, provision can be made for one or more physical links other than the single conventional ISO link of an eUICC. The invention thus can benefit from the flexibility of the different physical interfaces that a secure element can use within a context other than that of the management of subscriber profiles (i.e. an eUICC context).

An eUICC according to the invention integrated in the host terminal thus supports a connection with connection tabs other than those conventionally used for an eUICC card.

The establishment of different separate communication links (one for each active subscriber profile of a plurality of subscriber profiles simultaneously active in the eUICC) between the host terminal and the eUICC allows effective routing of the streams of messages (commands or responses) to or from each corresponding active subscriber profile, using the communication link established for this active profile.

Figure 3:
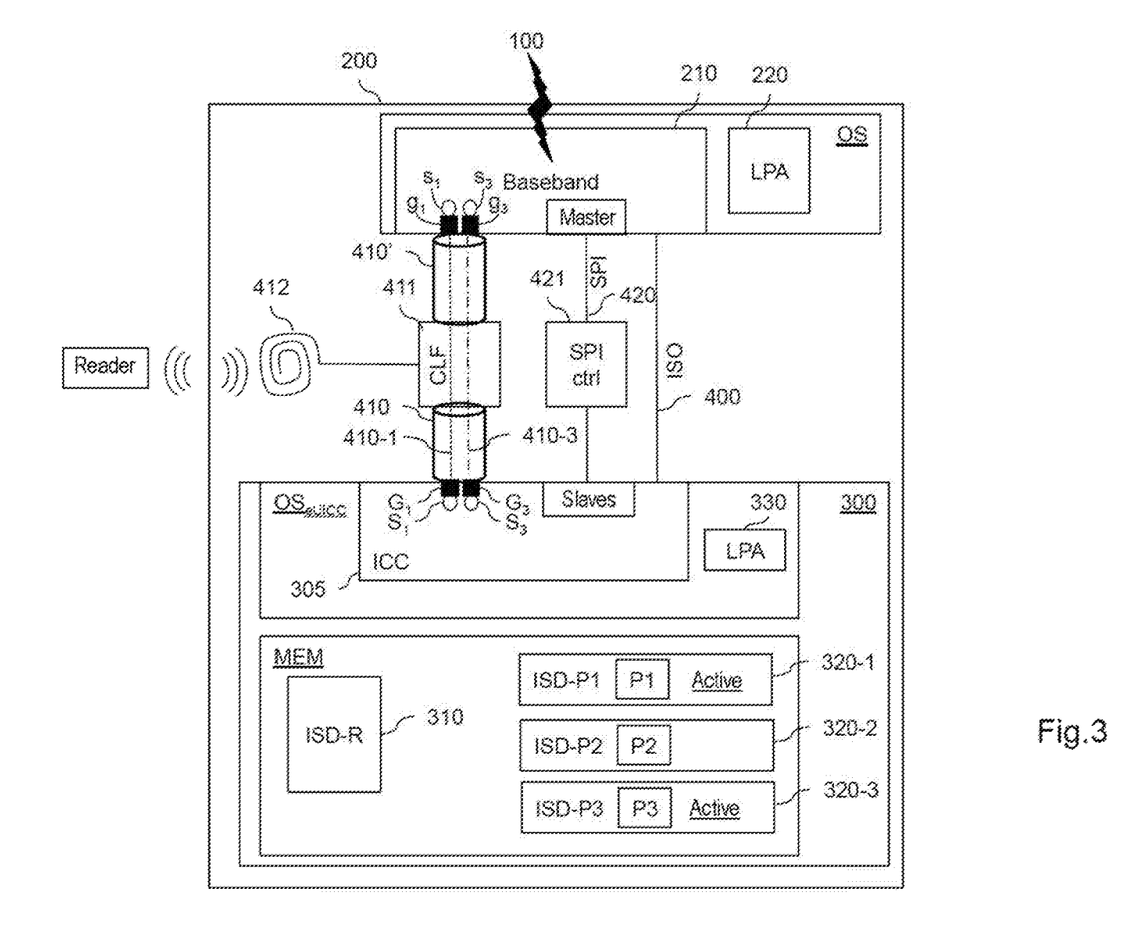
FIG. 3 schematically illustrates a host terminal and an eUICC card integrated according to embodiments of the invention.

FIG. 3 schematically illustrates a host terminal 200 integrating an eUICC card 300 according to embodiments of the invention.

The host terminal still comprises a communication interface (not shown), which offers a plurality of communication resources allowing the terminal to be connected to a plurality of operators using a plurality of profiles. The communication interface can comprise a single physical antenna or a plurality of physical antennae, and these optionally can implement multiplexing (temporal, frequency, or other), thus providing a plurality of communication resources (time slot, frequency carrier, etc.) for accessing the mobile networks using a plurality of profiles.

In the example of the figure, the host terminal 200 has, in addition to a conventional ISO link 400, a contactless communication management module, denoted CLF 411, and an SPI bus 420 managed by an SPI controller (SPI ctrl) 421.

In a known manner, the CLF module 411 is used by the OS to contactlessly communicate with an external reader via an antenna 412 of the terminal 200. The CLF module 411 is connected to one or more tabs of the eUICC 300, typically a single tab allowing implementation of the SWP protocol. Connecting the CLF module to the OS of the terminal and to the eUICC 300 is known to a person skilled in the art, since it is already implemented for secure elements according to the "eSE" (embedded Secure Element) form factor defined by the Global Platform standard. Thus, a new physical link 410 (in this case based on the SWP protocol) is placed between the CLF 411 and the eUICC 300; with the CLF 411 and the OS also being connected via a physical link 410' (for example, of the I²C, SPI type, etc.). The CLF 411 therefore allows a physical link to be placed between the eUICC and the OS.

Similarly, the SPI controller 421 allows a physical communication bus 420 to be placed between the OS and the eUICC 300.

These three physical links, as shown in FIG. 3, are only examples. Other types of physical links (for example, I2C) can be used in combination or as a replacement. A plurality of physical links of the same type also can be used, for example, a plurality of ISO links.

As will be described hereafter, the SWP and SPI links support mechanisms, such as the HCI interface for the SWP protocol (or HCI/SWP), allowing easy placement of a plurality of simultaneous communication logical links. Thus, embodiments of the invention can implement a single physical link allowing instantiation of a plurality of simultaneous logical links. For example, some embodiments, called "full HCI/SWP" embodiments, can be solely based on the HCI/SWP interface.

The HCI interface is a logical interface that implements a set of host processes connected to an HCI controller, thus forming a topology of star-shaped physical links, in which the exchanges of messages between different hosts are performed via the HCI controller. This HCI controller is implemented in particular in the CLF module 411. The HCI interface is described in greater detail in technical document ETSI TS 102 622 V12.0.0, entitled "Smart Cards; UICC—Contactless Front-end (CLF) Interface; Host Controller Interface (HCI)".

In a known manner, two entities can exchange according to an HCI communication establishment protocol in order to establish a logical communication link with each other. In the present invention, the baseband processor 210 and the ICC controller 305 of the eUICC 300 thus can establish logical communication links, under HCI, for each active profile of the eUICC. This will be described in further detail hereafter.

The baseband processor 210 will thus instantiate a host or service that is dedicated, for example, to the eUICC 300 or to a particular ISD-R 310 or to the targeted active profile P. The baseband processor 210 will, for example, associate the host or instantiated service with a communication resource (antenna or time or frequency slot, etc.), thus defining a single link between an active profile and the communication resource (via the host or service). The subsequent operations of the processor 210 will mainly consist in routing the network streams received on the ad hoc host or service (clearly depending on the active profile P targeted by these streams, in particular according to the communication resource on which they are received).

For its part, the ICC controller 305 will instantiate a host or service for each desired active profile. The subsequent operations of the ICC controller 305 will mainly consist in routing the messages received via a host/service to the corresponding active profile (and reciprocally for transmitting the responses from this active profile on the ad hoc host/service).

Establishing a logical link between these hosts then comprises, in a known manner, instantiating gates ("HCI gates") and establishing a pipe (or "HCI pipe") between these HCI gates. The baseband processor 210 thus can comprise a correspondence table (or equivalent) storing the associations {active profile P—HCI gate or pipe on the terminal side}, while the ICC controller 305 can comprise a correspondence table storing the associations {active profile P—HCI gate or pipe on the eUICC side}. In particular, the table on the baseband processor 210 side can associate an HCI gate or pipe (on the terminal side) with an assigned communication resource (antenna or time or frequency slot, etc.), the effective link with an active profile P is completed by the table on the ICC controller 305 side.

In the example of the figure, the eUICC card 300 has two active subscriber profiles, P1 and P3, managed under the same root security domain ISD-R 310. Services S1 and S3 are implemented by the ICC controller 305 respectively dedicated to the active profiles P1 and P3. Similarly, the baseband processor 210 instantiates two services s1 and s3 used for routing messages relating to the two profiles P1 and P3, for example, messages received on two separate antennae or on two separate communication resources. The implementation of the HCI/SWP interface allows two gates G1 and G3 to be instantiated on the ICC controller 305, which are respectively associated with the services S1 and S3, and two gates g1 and g3 to be instantiated on the baseband processor 210, which are respectively associated with the services s1 and s3 of the active profiles P1 and P3. Two HCI pipes are thus established: the pipe 410-1 between g1 and G1 dedicated to conveying messages relating to the single active profile P1 and the pipe 410-3 between g3 and G3 dedicated to conveying messages relating to the single active profile P3.

In this example, the physical links SPI 420 and ISO 400 are not used. It could be omitted so that this embodiment is a "full HCI/SWP" embodiment.

Similarly, the SPI controller 421 allows logical links to be established between a single SPI master provided on the baseband processor 210 and a plurality of SPI slaves provided on the ICC controller 305, with each being statically or dynamically associated with the different profiles P of the eUICC.

Figure 4:
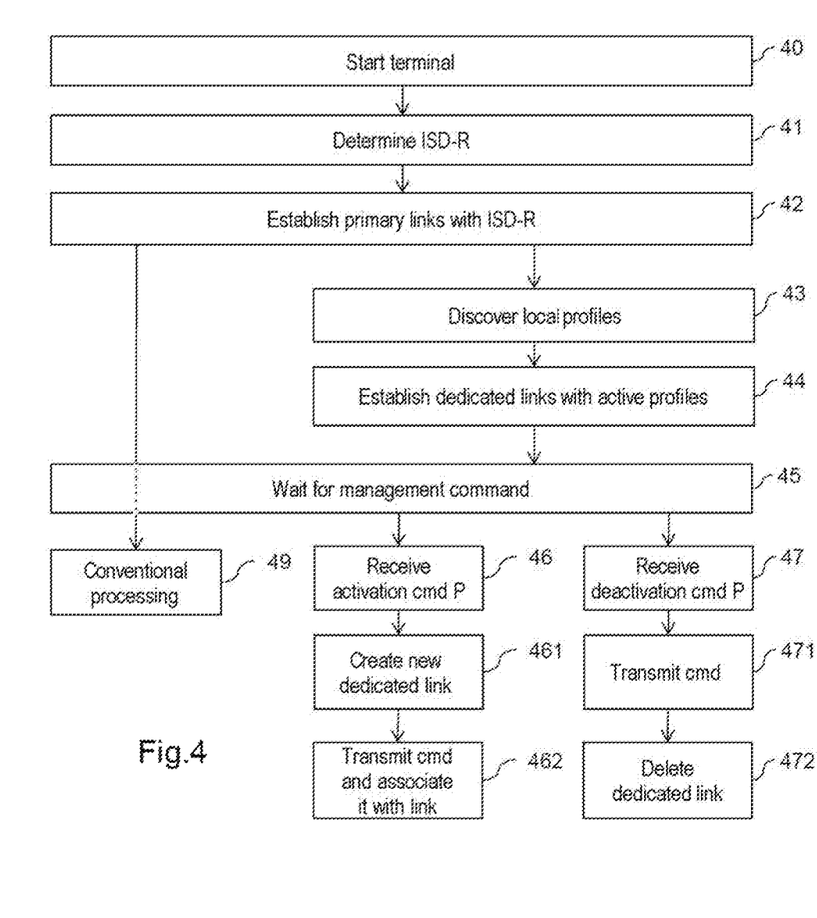
FIG. 4 shows, in the form of a flow chart, steps of managing logical links between the host terminal and the eUICC card of FIG. 3, according to embodiments of the invention.

FIG. 4 uses a flow chart to illustrate steps of managing logical links.

In step 40, the host terminal 200 containing the eUICC card 300 is started, for example, by the user. Conventionally, this operation launches the execution of the operating system OS, and therefore of the baseband processor 210, and powers the eUICC 300.

In a step 41, the terminal 200 determines the one or more root security domains ISD-R 310 of the eUICC card 300. It determines the number, determines the identifier (AID) of each ISD-R, as well as the corresponding logical entity in the eUICC with which it needs to establish a communication link. It can involve a service generically associated with the eUICC or with each ISD-R in the case of the HCI/SWP interface, or a slave associated with each ISD-R in the case of the SPI interface.

This information can be static, i.e. defined in the memory of the terminal 200 when the eUICC card 300 is integrated in the terminal, or have been recovered during a preceding procedure (see the following steps) of discovering ISD-Rs in the eUICC card 300. Step 41 then involves reading this information in the memory.

The information also can be dynamic or may not yet have been obtained by the terminal 200. In this case, the terminal 200 can implement a procedure for discovering ISD-Rs 310 in the eUICC card 300 by exchanging therewith over a primitive link.

This primitive link can be, for example, the conventional ISO link 400 accessible by the baseband processor 210. As a variant, said processor can use a primitive logical link, of the static HCI pipe type, dedicated to the eUICC 300. An HCI pipe is said to be static if it is still available, which can be the case if a primitive or generic gate $g_p$ is still available on the terminal and a corresponding primitive or generic gate $G_p$ is still available on the eUICC (and known to the baseband processor). Thus, the static primitive pipe between $g_p$ and $G_p$ can be used. The same approach can be implemented on the basis of the SPI interface.

The procedure of discovering ISD-Rs can be based on a set of commands/responses exchanged by the baseband processor and the $OS_{eUICC}$ of the eUICC card 300, via the established primitive pipe.

By way of an example, an expanded Global Platform command of the GET DATA type can be used. The bytes PIP2 of the APDU command header are particularly set to a specific value identifying the GET DATA command as forming part of the discovery procedure.

The expanded command comprises, in its useful data part, the portion of AID common to the ISD-Rs, in particular the hexadecimal numbers 15 to 20 are set to '00 00 01', as defined in Appendix H of technical documentation "SGP.02-Remote Provisioning Architecture for Embedded UICC Technical Specification v3.2". This common portion indicated in the command can be used as a mask by the eUICC 300 to return all the AIDs that it contains that correspond to the mask (therefore all the AIDs of ISD-R).

Thus, in response to the command, the eUICC 300 returns the AIDs of all the ISD-Rs that it houses, with these returned AIDs comprising the common AID portion ('00 00 01') followed by a differentiating portion, for example, hexadecimal numbers 21 and 22 of the AID (allowing up to 256 ISD-Rs to be differentiated).

Once the ISD-Rs are known to the baseband processor 210, said processor establishes a primary link for each identified ISD-R; this is step 42.

An ISD-R (optionally the only one) can be assigned to the conventional ISO link 400, if there is one. A primary logical link (a dynamic HCI pipe or a master-slave SPI link) can be established for each of the other identified ISD-Rs, between an HCI gate instantiated by the processor 210 for this ISD-R or the SPI master of the processor 210 and the HCI gate or the SPI slave of the eUICC 300 obtained in step 41 for the considered ISD-R.

In the case of a "full HCI/SWP" terminal with an eUICC card 300 having three ISD-Rs 310, the baseband processor 210 establishes three primary dynamic pipes 410-$x$ HCI/SWP between three gates instantiated by the processor 210 for each of the three ISD-Rs and one or more gates provided by the ICC controller 305 of the eUICC 300. The three pipes can, for example, link the same generic HCI gate to the eUICC in the ICC controller 305. As a variant, they can each link an HCI gate dedicated to their specific ISD-R.

As a variant, static HCI pipes are established if the gates that are used are statically defined and are always present.

The baseband processor 210 keeps track of these created links in order to suitably route messages. For example, it can create and keep up-to-date a table of the ISD-Rs associating the created primary links with the different ISD-Rs.

In one embodiment of the invention in which the profiles P of the eUICC 300 are distributed under the management of a plurality of ISD-Rs 310 and only a single subscriber profile is active at a time per ISD-R, the primary link that is thus established for each ISD-R is then dedicated to the active profile P (or ISD-P) of this root domain. There is thus one link dedicated to each active profile P.

To a certain extent, this resembles conventional management 49 of each ISD-R taken individually, in which all the APDU commands/responses (creation/deletion of ISD-P, downloading/updating/deletion of profiles in the ISD-Ps of the relevant ISD-R, profile activation/deactivation, requirement by the MNO) pass through the same primary link associated with the ISD-R (like the conventional solutions undertake through the single ISO link 400 of FIG. 1).

In one embodiment in which a plurality of profiles P managed under the same root security domain (such as, for example, in the case of FIG. 3) is simultaneously activated (i.e. simultaneously maintained in an active state) the baseband processor 210 determines, in step 43, the local profiles of each ISD-R.

To this end, the baseband processor 210 can use the discovery services (LPD) on the primary link of each ISD-R to recover the list of local profiles (and therefore of ISD-P 320), as well as their states (active or non-active).

On the basis of the obtained information, the baseband processor 210 requires, in step 44, the establishment of a link dedicated to each active profile P. For example, it can involve using one or more additional ISO links and/or HCI pipes to be created and/or SPI channels.

The primary link established for each ISD-R can be assigned and therefore can be dedicated to a first active profile P. Advantageously, this primary link is only used for the profile management commands/responses, as described hereafter.

In the case of a "full HCI/SWP" terminal with an eUICC card 300 according to FIG. 3 (two active profiles), the baseband processor 210 establishes two dedicated HCI pipes 410-1 and 410-3 between two gates $g_1$ and $g_3$ instantiated by the processor 210 for each of the two active profiles P1 and P3 and one or more gates provided by the ICC controller 305 of the eUICC 300. The two pipes can, for example, link the same generic HCI gate to the eUICC or to the ISD-R instantiated by the ICC controller 305. As a variant, they can each link an HCI gate dedicated to their active profile, i.e. $G_1$ for the profile P1 and $G_3$ for the profile P3.

The baseband processor 210 keeps track of these created links in order to suitably route messages. For example, it can create and keep up-to-date a table of the active profiles associating the created dedicated links with the different active profiles. In this way, it associates a plurality of separate communication links with the eUICC with a respective plurality of active subscriber profiles of the eUICC.

At this stage, the baseband processor 210 routes the GSM streams received from the MNOs on the mobile networks to the corresponding active profiles. This routing is explained hereafter with reference to FIG. 5.

Preferably, the baseband processor 210 can statically define a certain number of gates or services (HCI, SPI) associated with a number of available communication resources (antennae, time or frequency slot, etc.). It is these gates or services that are used to establish the primary links with gates or slaves instantiated by the eUICC 300 (step 42) and/or the links dedicated to the active profiles (step 44).

Furthermore, there cannot be any more links (primary and dedicated) than the maximum number of communication resources (which number depends on the number of antennae and of multiplexing mechanisms that can be implemented).

In this approach, it follows that an available communication resource is ultimately associated with (and therefore used by) only one active profile at a time.

The baseband processor 210 stands by for administrative management commands of the root domains ISD-R in step 45.

This management is carried out by conventional commands/responses on the primary link associated with each ISD-R. It particularly involves operations of creating/deleting ISD-Ps, downloading/updating/deleting profiles P in the ISD-Ps of the relevant ISD/R and/or activating/deactivating profiles. As a variant, other mechanisms triggering administrative operations can be contemplated within the scope of the present invention, such as receiving commands via different channels (for example, NFC [Near Field Communication] or Wi-Fi [commercial name]), or using internal components (LPA type on the host terminal 200) that themselves generate such administrative requests (for example, the activation of a profile).

In one embodiment in which each active profile P has only one dedicated link with the baseband processor 210, the actions of activating/deactivating profiles can result in a modification of the dedicated links.

Furthermore, in step 46, a command for activating a profile P of a target ISD-R, for example, the profile P2 of FIG. 3, is received either by the baseband processor 210 or by the targeted ISD-R.

In response, a new link with the eUICC 300 is created in step 461, for example, a new HCI pipe 410-2 between a gate $g_2$ instantiated by the processor 210 for the profile P2 to be activated and a gate provided by the ICC controller 305 (an HCI gate generic to the eUICC or to the ISD-R or an HCI gate $G_2$ dedicated to this profile P2).

For example, various gates can be pre-assigned to different communication resources of the host terminal 200 and the gate $g_2$ can be selected as the first of the pre-assigned gates that is not yet used. This information can be known to the targeted ISD-R or can be recovered thereby, from the baseband processor 210, via the primary link, for example.

Knowing this information, the targeted ISD-R can request the instantiation of the gate $G_2$ with the ICC controller 305 and the establishment of the dedicated link 410-2 between the gates $g_2$ and $G_2$.

Then, in step 462, the activation command of the profile P (P2 in the example) is linked to the new created link (410-2 in the example). For example, the baseband processor 210 can send this command on the newly created link 410-2, so that the eUICC immediately knows that this new link is to be associated with the profile P2 to be activated. As a variant, the baseband processor 210 can send the activation command over the primary link associated with the relevant ISD-R, by advising an identifier of the newly created link so as to indicate that this new link is dedicated to this profile to be activated.

Finally, if the ISD-R has recovered the pre-assigned gate $g_2$ information and has created the link 410-2 itself, it knows the association between 410-2 (or the gate $G_2$) and the profile P2.

The ICC controller 305 keeps track of this new link by updating, for example, a table of the active profiles associating the created dedicated links (or the gates $G_i$) with the different active profiles.

For its part, the baseband processor 210 can have a relatively similar table, associating the created dedicated links (or the gates $g_i$) with the different active profiles. As a variant, the association can be indirect: the baseband processor 210 only has a track of the pre-assigned gates $g_i$ and of the associated communication resources. Indirectly, it is the table on the ICC controller 305 that allows the link to be made with the profiles.

It is thus possible to see that, in this example, the terminal 200 can be connected to a mobile telephony network using the profile P2 via the communication resource corresponding to the pre-assigned gate $g_2$.

A modification of the dedicated links also occurs in the event of the deactivation of a profile.

In step 47, a command for deactivating a profile P of a target ISD-R, for example, the profile P1 of FIG. 3, is received. The command is transmitted, in step 471, either over the link dedicated to this profile or over the primary link of the relevant ISD-R.

Then the dedicated link is deleted (in particular by the termination of the HCI pipe or of the corresponding SPI master-slave link) in step 472, if it does not at the same time involve the primary link associated with the ISD-R.

The ICC controller 305, and optionally the baseband processor 210, keeps track of this deleted link by updating, for example, the table of the active profiles associating the links dedicated to the different profiles that are still active.

In particular, in the case of the pre-assigned gates (or services), no action is taken by the baseband processor 210. Only the ICC controller 305 can delete the relevant gate $g_i$ and update its table of active profiles.

The example of FIG. 4 is based on dynamic procedures for discovering ISD-Rs and active profiles. In a variant, all the existing profiles on the eUICC 300 can be defined in the terminal 300 (or have been previously recovered once and for all), and the baseband processor 210 can statically create a dedicated link for each profile, whether or not it is active. This static approach prevents administrative management of the dedicated links during the use of the eUICC 300.

The process of FIG. 4 is applicable to the start-up of the terminal 300. Similar operations can be implemented in the event of refreshing the terminal: for example, the static HCI pipes permanently exist, whereas the dynamic HCI pipes must be reestablished.

Figure 5:
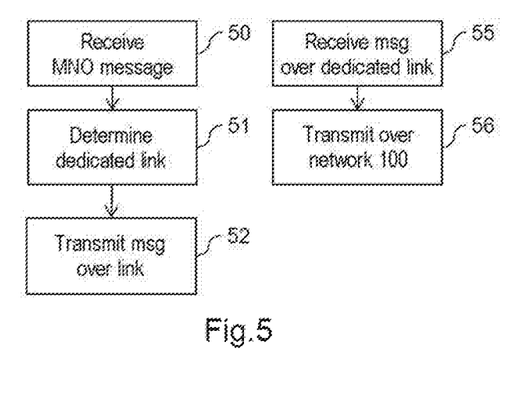
FIG. 5 shows, in the form of a flow chart, steps of routing messages per active profile, on the host terminal, according to embodiments of the invention.

FIG. 5 illustrates, using a flow chart, steps of routing, by the baseband processor 210, messages between an active profile P and a corresponding MNO 130.

In reception mode, the processor 210 receives, in step 50, a message from the MNO 130 for the active profile P. It generally involves a command. In step 51, it determines the profile P affected by this message (for example, via information in the received radio stream) and the link dedicated to this active profile P. For example, the processor 210 consults the table of active profiles in order to determine the dedicated link associated with the determined profile. Once the dedicated link is identified, the processor 210 transmits, in step 52, the message received on this dedicated link, in particular in the form of an APDU command.

In the case of gates (or services) pre-assigned to the available communication resources, the processor 210 advantageously only has to route the messages received via a communication resource over the corresponding pre-assigned gate.

In transmission mode, the processor 210 receives, in step 55, a message from the eUICC 300 over a link dedicated to an active profile P. It generally involves an APDU response to an APDU command transmitted in step 52. In step 56, the processor 210 transmits the response to the MNO 130 via the mobile telephony network 100 of this operator.

Once again, in the case of gates (or services) pre-assigned to the available communication resources, the processor 210 advantageously only has to route the messages received via a pre-assigned gate over the corresponding communication resource.

For its part, when the eUICC 300 is started (via its electrical power supply by the terminal 200), it reacts to the commands received on its communication interfaces with the terminal 200 by executing them, then by transmitting responses over these same interfaces.

These commands can originate from the administrative management of the secure ISD-R and ISD-P domains:

discovery procedures, ISD-P creation/deletion commands, downloading/updating/deletion of profiles in the ISD-Ps, profile activation/deactivation. They are conventionally processed by the eUICC 300.

However, when a new communication link is created between it and the baseband processor 210, the ICC controller 305 can also update a table of ISD-Rs and a table of active profiles, in which it keeps up-to-date, on the one hand, the associations between the created primary links and the ISD-Rs and, on the other hand, the associations between the dedicated links and the active profiles. These tables allow the ICC controller 305 to complete the appropriate routings, as described hereafter with reference to FIG. 6.

Figure 6:
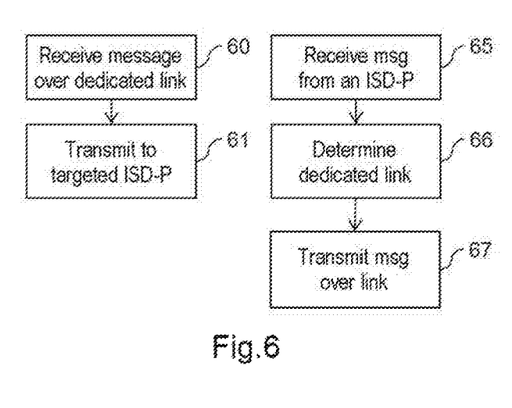
FIG. 6 shows, in the form of a flow chart, steps of routing messages per active profile, on the eUICC card, according to embodiments of the invention.

In reception mode, the ICC controller 305 receives, in step 60, a message from the terminal over a link dedicated to an active profile P. It generally involves an APDU command transmitted in step 52. In step 61, the ICC controller 305 transmits this message to the ISD-P corresponding to the active profile P, based on the table of active profiles.

In transmission mode, the ICC controller 305 receives, in step 65, a message from an active profile P (or from an ISD-P). It generally involves a response to a command transmitted in step 61. In step 66, the ICC controller 305 determines the link dedicated to this active profile P. For example, the ICC controller 305 consults the local table of active profiles to determine the dedicated link associated with the profile P. Once the dedicated link is identified, the ICC controller 305 transmits, in step 67, the message received on this dedicated link (which will be received by the baseband processor 210 in step 55).

Figure 7:
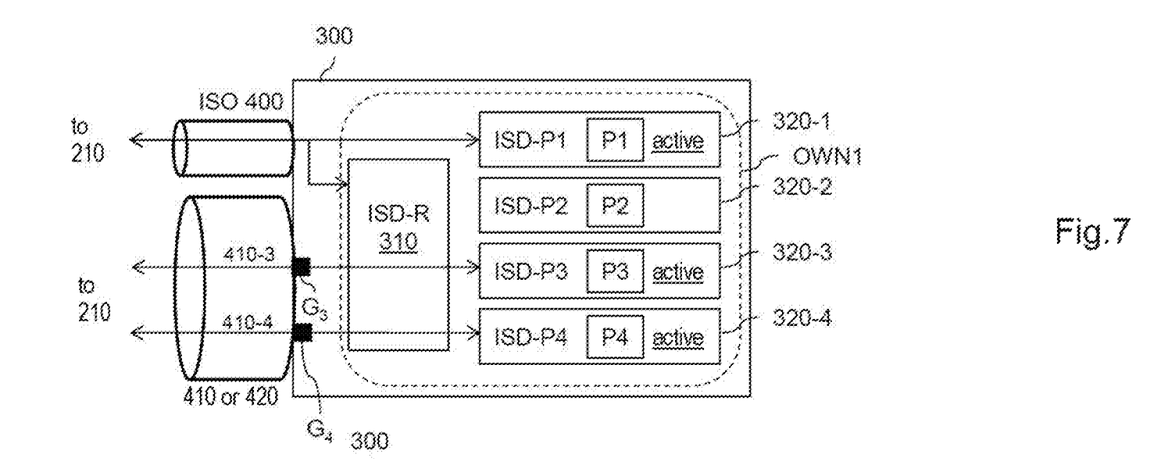
FIG. 7 illustrates first embodiments of the invention according to FIG. 3.

FIG. 7 illustrates an embodiment of the invention, similar to that of FIG. 3, in which the secure element 300 contains a single ISD-R domain 310 (corresponding to a single ownership OWN1), which comprises a plurality of profiles P1 to P4 (and corresponding ISD-P1 to ISD-P4). In this mode, a plurality of subscriber profiles managed under the same root security domain ISD-R 310 is active simultaneously, in this case P1, P3 and P4.

Among the links that are dedicated to the profiles and that are implemented, that which is dedicated to P1 is a conventional ISO link compliant with standard ISO 7816. This ISO link also can be the primary link associated with the root domain ISD-R 310 for the administrative management of the profiles. In the example of the figure, the links dedicated to the active profiles P3 and P4 are, for example, logical links (or pipes) 410-3 and 410-4 established through a host controller interface (HCI) over a physical link 410 between the secure element and the host terminal. To this end, the gates G3 and G4 are instantiated by the ICC controller 305. As a variant, the same gate dedicated to the ISD-R, and even to the entire eUICC, can be used by these HCI pipes, with the pipes being differentiated by the gates instantiated in relation to the baseband processor 210.

In a variant to the HCI/SWP interface, SPI master-slave links can be used. Of course, the use of one or more HCI pipes can be combined with the use of one or more SPI links. In another variant, all or part of these other links dedicated to the profiles P3 and P4 can be implemented through an additional ISO link.

The embodiment of FIG. 7 uses the conventional ISO link as a primary link for the ISD-R 310. As a variant, a primary HCI pipe (not shown) can be established for the ISD-R 310 (administrative management of the ISD-Ps and profiles) via a dedicated gate.

Figure 8:
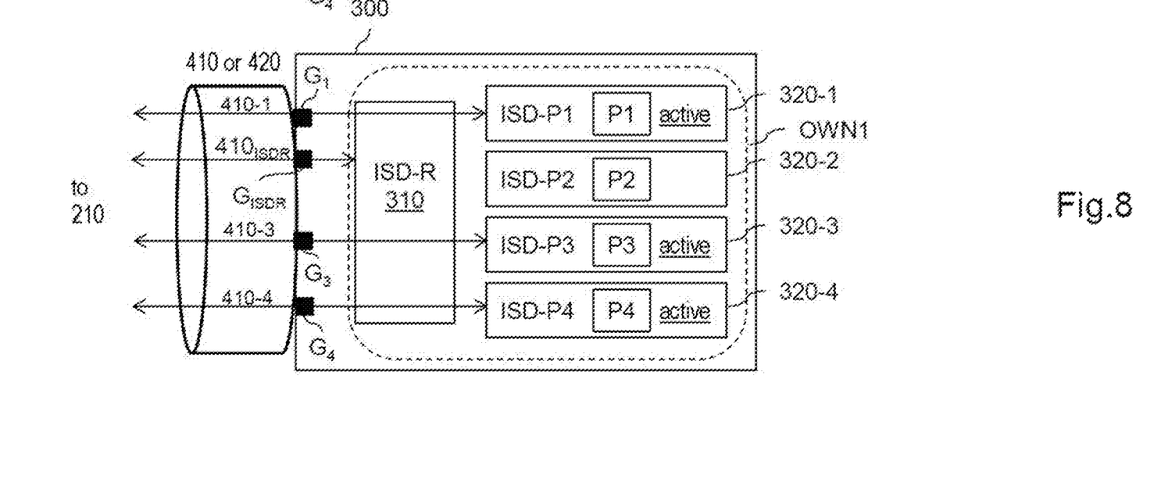
FIG. 8 illustrates such a first embodiment as a "full HCI/SWP" version.

FIG. 8 illustrates the same configuration as FIG. 7 in a "full HCI/SWP" mode: a primary HCI pipe $410_{ISDR}$ is established for the ISD-R (administrative management of the ISD-Ps and profiles) via a dedicated gate $G_{ISDR}$, a dedicated pipe 410-1 is established for the active profile P1 via the gate $G_1$, a dedicated pipe 410-3 is established for the active profile P3 via the gate $G_3$, and a dedicated pipe 410-4 is established for the active profile P4 via the gate $G_4$. As a variant, the same gate dedicated to the ISD-R, and even to the entire eUICC, can be used by these HCI pipes, with the pipes being differentiated by the gates instantiated in relation to the baseband processor 210.

A variant of FIG. 8 can involve a "full SPI" mode in which all the links are SPI links.

Figure 9:
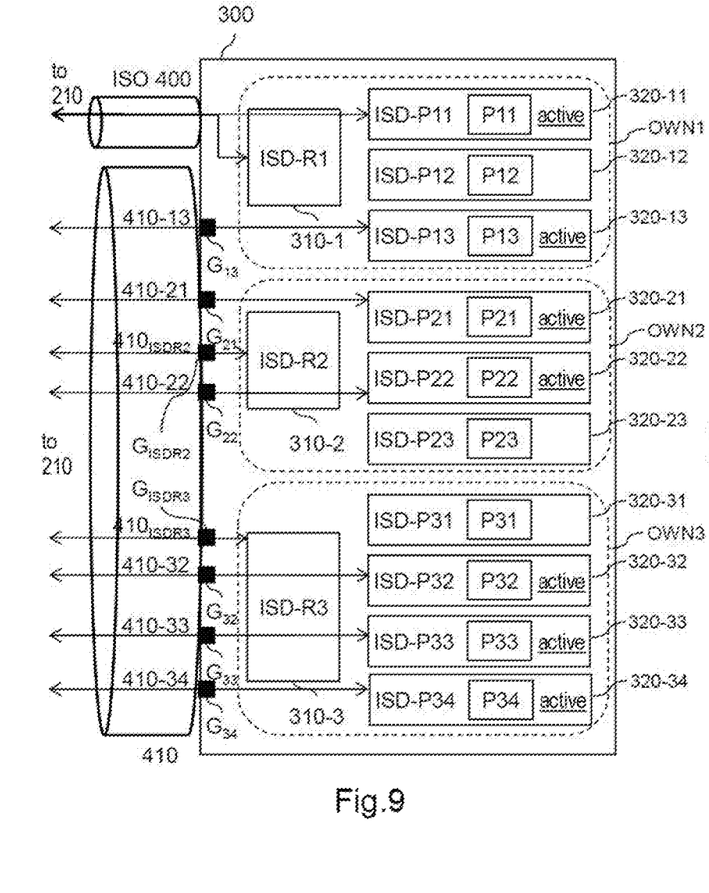
FIG. 9 illustrates second embodiments of the invention.

FIG. 9 illustrates another embodiment, in which the subscriber profiles present in the secure element are distributed under the management of a plurality of root security domains, in this case three domains ISD-R1 to ISD-R3 (corresponding to three ownerships OWN1 to OWN3). The root domains can contain variable numbers of profiles P and variable numbers of active profiles among them.

In this example, a plurality of subscriber profiles managed under the same root security domain ISD-R 310 is active simultaneously, in this case P11 and P13 for ISD-R1, P21 and P22 for ISD-R2 and P32, P33 and P34 for ISD-R4.

The ISO link 400 is dedicated to the first active profile P11 and is shared with the ISD-R1 for the administrative management of the profiles in this root domain.

For all the other active profiles, the baseband processor 210 and the ICC controller 305 establish dedicated HCI pipes: 410-13 via gate G13 for profile P13, 410-21 via gate G21 for profile P21, etc. As a variant, the same gate dedicated to each ISD-R, or a general gate dedicated to the entire eUICC, can be used by these HCI pipes, with the pipes then being differentiated by the gates instantiated in relation to the baseband processor 210.

In a variant or in combination, one or more master-slave links can be used and/or one or more additional ISO links can be used.

Figure 10:
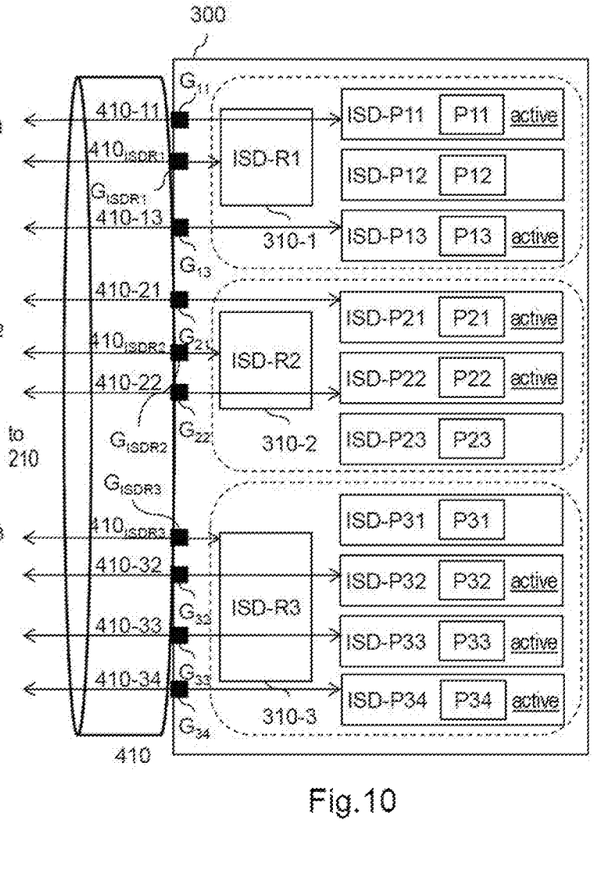
FIG. 10 illustrates such a second embodiment as a "full HCI/SWP" version.

FIG. 10 illustrates the same configuration as FIG. 9 in a "full HCI/SWP" mode: a pipe $410_{ISDR}$ is established for each root domain via a corresponding gate $G_{ISDR}$ (for the administrative management) and a pipe 410-x is established for each active profile Px via a gate $G_X$. As a variant, the same gate dedicated to each ISD-R, or a general gate dedicated to the entire eUICC, can be used by these HCI pipes, with the pipes then being differentiated by the gates instantiated in relation to the baseband processor 210.

A variant of FIG. 10 can involve a "full SPI" mode in which all the links are SPI links.

Figure 11:
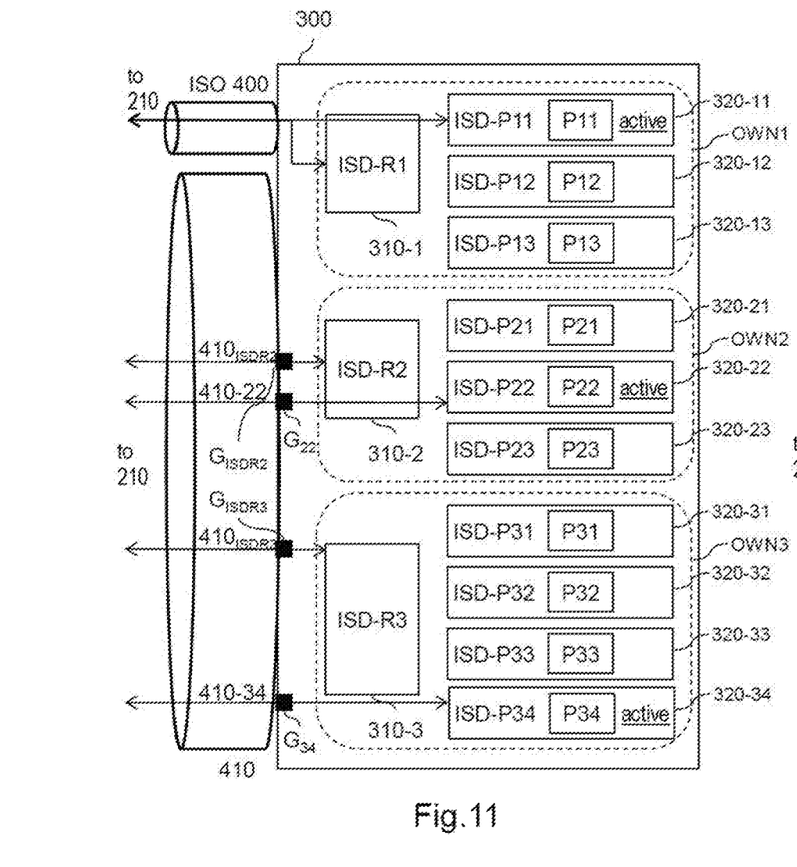
FIG. 11 illustrates third embodiments of the invention.

FIG. 11 illustrates another embodiment, in which the subscriber profiles present in the secure element are distributed under the management of a plurality of root security domains, and a single subscriber profile P is activated at a time per root security domain ISD-R.

In this case, the conventional ISO link 400 can be dedicated to the first root domain ISD-R1 and can be conventionally used to manage the profiles in this domain and to convey the exchanges between an active profile P and its MNO 130.

Similarly, a single logical link (HCI pipe or SPI link) can be established for each of the other root domains ISD-R2 and ISD-R3, with this single logical link being conventionally used to manage the profiles in this domain and to convey the exchanges between an active profile P of the relevant root domain and its MNO 130. The use of a single logical link is illustrated in FIG. 12, which is described hereafter.

In the example of FIG. 11, a logical link is provided ($410_{ISRD2}$ or $410_{ISRD3}$) associated with each of the other root domains ISD-R2 and ISD-R3 for the administrative management of the profiles and is provided with an additional logical link (410-x) dedicated to the active profile Px in each of these other root domains.

In one embodiment, one or more HCI/SWP, SPI and/or ISO links can be combined.

Figure 12:
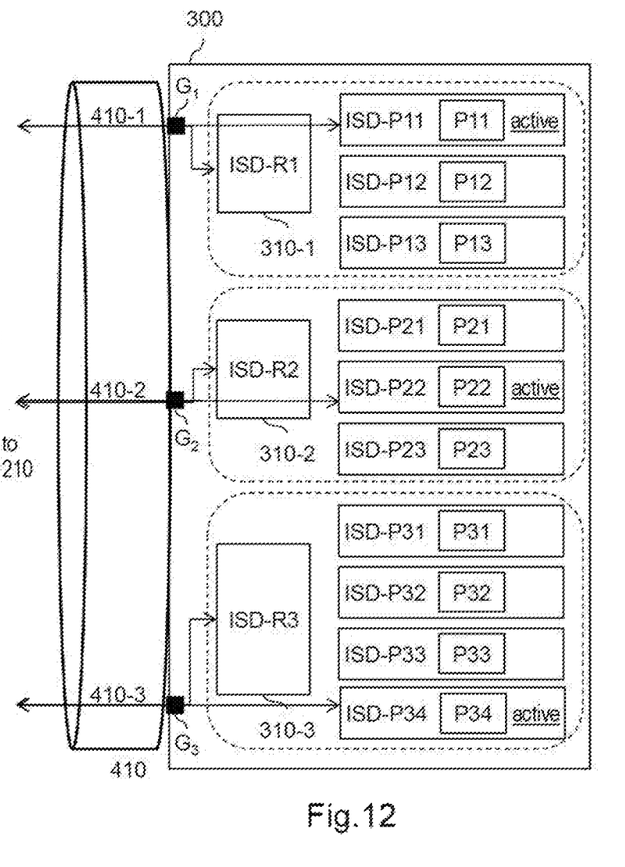
FIG. 12 illustrates such a third embodiment as a "full HCI/SWP" version.

FIG. 12 illustrates the same configuration as FIG. 11 in a "full HCI/SWP" mode with a single logical link (HCI pipe or SPI link) established for each of the root domains ISD-R1 to ISD-R3. This link per root domain is therefore conventionally used to convey both the administrative management messages of the profiles and the exchanges with the MNO corresponding to the active profile P.

The use of gates or services pre-assigned to the available communication resources is applicable to all the embodiments of FIGS. 7 to 12.

The aforementioned examples are only embodiments of the invention, which is not limited thereby.

The invention claimed is:

1. A secure element configured to interact with a host terminal, the secure element comprising:
   a communication interface controller for communicating with the host terminal and comprising a plurality of subscriber profiles, each subscriber profile authenticating a user in a mobile telephony network, and being configured to simultaneously activate a plurality of subscriber profiles,
   wherein the communication interface controller is configured to respectively associate a plurality of separate communication links with the host terminal with the plurality of active subscriber profiles,
   wherein a first communication link of the communication links, associated with a first active subscriber profile among the plurality of active subscriber profiles, is established on a first physical link between the secure element and the host terminal, and
   wherein a second communication link of the communication links, associated with a second active subscriber profile among the plurality of active subscriber profiles and distinct from the first active subscriber profile, is established on a second physical link between the secure element and the host terminal,
   the second physical link being distinct from the first physical link.

2. The secure element as claimed in claim 1, wherein the plurality of separate communication links comprises at least one logical link established through a Host Controller Interface (HCI) on a physical link between the secure element and the host terminal.

3. The secure element as claimed in claim 2, wherein a plurality of logical links established through the HCI on the physical link is associated with a respective plurality of active subscriber profiles of the secure element.

4. The secure element as claimed in claim 3, wherein the HCI is implemented on the Single Wire Protocol (SWP) between the host terminal and the secure element.

5. The secure element as claimed in claim 2, wherein the HCI is implemented on Single Wire Protocol (SWP) between the host terminal and the secure element.

6. The secure element as claimed in claim 2, wherein the plurality of separate communication links comprises one, two or more logical links established through a Serial Peripheral Interface (SPI).

7. The secure element as claimed in claim 2, wherein the plurality of separate communication links comprises one, two or more ISO links compliant with standard ISO 7816.

8. The secure element as claimed in claim 2, wherein the communication interface controller is configured to, during activation of a profile, instantiate a communication service and to establish a communication link between the instantiated service and a pre-assigned service of the host terminal.

9. The secure element as claimed in claim 1, wherein the plurality of separate communication links comprises one, two or more logical links established through a Serial Peripheral Interface (SPI).

10. The secure element as claimed in claim 5, wherein the plurality of separate communication links comprises one, two or more ISO links compliant with standard ISO 7816.

11. The secure element as claimed in claim 1, wherein the plurality of separate communication links comprises one, two or more ISO links compliant with standard ISO 7816.

12. The secure element as claimed in claim 1, wherein the communication interface controller is configured to, during activation of a profile, instantiate a communication service and to establish a communication link between the instantiated service and a pre-assigned service of the host terminal.

13. The secure element as claimed in claim 1, configured to simultaneously activate a plurality of subscriber profiles managed under a same root security domain.

14. The secure element as claimed in claim 1, wherein the plurality of subscriber profiles present in the secure element is distributed under management of two or more root security domains, and the secure element is configured to activate a single subscriber profile per root security domain at a time.

15. A host terminal configured for integrating with a secure element, the host terminal comprising:
   a baseband processor configured to associate a plurality of separate communication links with the secure element with a respective plurality of active subscriber profiles of the secure element,
   wherein a first communication link of the communication links, associated with a first active subscriber profile among the plurality of active subscriber profiles, is established on a first physical link between the secure element and the baseband processor of the host terminal, and
   wherein a second communication link of the communication links, associated with a second active subscriber profile among the plurality of active subscriber profiles and distinct from the first active subscriber profile, is established on a second physical link between the secure element and the baseband processor of the host terminal,
   the second physical link being distinct from the first physical link.

16. The host terminal as claimed in claim 15, further comprising:
   a host controller of the Host Controller Interface (HCI) implemented in a CLF contactless communication management module,
   wherein a host process of the baseband processor establishes, for an active subscriber profile, a pipe with a service managing the active subscriber profile in the secure element, via the CLF management module acting as host controller of the HCI.

17. The host terminal as claimed in claim 15, wherein the baseband processor is configured to establish a master-slave link for each one of the one or more active subscriber profiles, with a dedicated slave entity provided in the secure element.

18. The host terminal as claimed in claim 15, wherein a plurality of communication services is pre-assigned to a plurality of communication resources on one or more mobile telephony networks, and said separate communication links are established on the basis of the pre-assigned communication services so that each active subscriber profile is associated with a respective communication resource.

19. A method for controlling communication between a host terminal and a secure element integrated in the host terminal and having a plurality of subscriber profiles stored therein that each authenticate a user in a mobile telephony network, the method comprising:

establishing, for each active subscriber profile of a plurality of subscriber profiles simultaneously active in the secure element, a separate communication link between the host terminal and the secure element, wherein a first communication link of the communication links, associated with a first active subscriber profile among the plurality of active subscriber profiles, is established on a first physical link between the secure element and the host terminal, and wherein a second communication link of the communication links, associated with a second active subscriber profile among the plurality of active subscriber profiles and distinct from the first active subscriber profile, is established on a second physical link between the secure element and the host terminal, the second physical link being distinct from the first physical link; and routing, in the host terminal or in the secure element, a stream of messages relating to an active subscriber profile to the communication link established for said active subscriber profile.

20. A non-transitory computer-readable medium, on which are stored instructions of a computer program that implement the method of claim 19, when said instructions are executed by a microprocessor.

\* \* \* \* \*